United States Patent
Tawaragi (10) Patent No.: US 7,366,067 B2
(45) Date of Patent: Apr. 29, 2008

(54) RECORDING CLOCK SIGNAL GENERATING APPARATUS AND RECORDING CLOCK SIGNAL GENERATING METHOD FOR INFORMATION RECORDING DEVICE

(75) Inventor: Yuji Tawaragi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 343 days.

(21) Appl. No.: 10/615,386

(22) Filed: Jul. 9, 2003

(65) Prior Publication Data

US 2004/0037185 A1    Feb. 26, 2004

(30) Foreign Application Priority Data

Jul. 9, 2002    (JP)    .............................. 2002-199656

(51) Int. Cl.
  G11B 7/0045    (2006.01)
(52) U.S. Cl. .................................. 369/47.28; 369/59.17
(58) Field of Classification Search .................... None
  See application file for complete search history.

(56) References Cited

U.S. PATENT DOCUMENTS

| 6,272,089 | B1 * | 8/2001 | Kato | ........................ 369/53.41 |
| 6,498,773 | B1 * | 12/2002 | Sugie et al. | ............. 369/47.28 |
| 6,556,523 | B1 * | 4/2003 | Masui | ....................... 369/47.28 |

FOREIGN PATENT DOCUMENTS

| JP | 10-293926 | 11/1998 |
| JP | 11-203785 | 7/1999 |
| JP | 2001-67816 | 3/2001 |
| JP | 2001-177397 | 6/2001 |
| JP | 2002-25058 | 1/2002 |
| JP | 2002-50128 | 2/2002 |

OTHER PUBLICATIONS

Kazuo Kuroda, Information recording apparatus for writable recording media, Jul. 21, 1999, European Patent Office.*
Japan Office Action (Notification of Reason(s) for Refusal) dated Dec. 11, 2007 with English translation.

* cited by examiner

*Primary Examiner*—William Korzuch
*Assistant Examiner*—Joseph Haley
(74) *Attorney, Agent, or Firm*—Kratz, Quintos & Hanson, LLP (57) ABSTRACT

A combined signal Spc in which a pre-pit signal is superposed on a wobble signal is generated based on a radial push-pull signal Spp with a noise component having been removed therefrom. Based on the combined signal Spc, a wobble signal $S_{WB}$ with the phase $\theta 0$ not having time fluctuation and a pre-pit signal $S_{PD}$ are generated with the phases compared to each other, and then a phase adjustment signal $S_{CNT}$ corresponding to a phase difference $\theta e$ is generated. The phase differences $\theta e$ are stored, and an average value $\theta r$ thereof generated, the phase difference $\theta e$ is compared to the average value $\theta r$, the phase $\theta 0$ is shifted according to only by the phase difference $\theta e$ only when the phase difference $\theta e$ is within the range of $(\theta r \pm W)$, and then a wobble signal $S_{WB}$ with the phase $\theta 1$ synchronized to the pre-pit signal $S_{PD}$ is generated.

7 Claims, 6 Drawing Sheets

RECORDING CLOCK SIGNAL GENERATING APPARATUS AND RECORDING CLOCK SIGNAL GENERATING METHOD FOR INFORMATION RECORDING DEVICE

BACKGROUND OF THE INVENTION

1. Field of the Invention

The present invention relates to a recording clock signal generating apparatus in an information-recording device for recording information in a recording medium and a method for the same.

2. Description of Related Art

Generally groove track wobble is provided on a DVD-R (Digital Versatile Disk-Recordable) and address pit called Land Pre-pit is formed between the groove tracks. An information-recording device for recording information in a recording medium as described above records a sync-pattern for the information to be recorded so that the sync-pattern is synchronous to a Pre-pit signal detected from the Land Pre-pit. Namely the information-recording device corrects a phase of a clock signal used for recording so that the Pre-pit signal is located at a center of a sync-information for 14T included in the sync-frame. Since the correction is extremely precise, the information-recording device is required to use not only a wobble signal but also the pre-pit signal for correcting a phase of the clock signal. In the high precision correction as described above, the timing for detecting of the pre-pit signal is very important.

When a defect caused by, for instance, a dust or a flaw on a surface of the recording medium, the pre-pit signal may erroneously be detected due to the defect. In this case, since the pre-pit signal erroneously detected is corrected to be located at the center of the sync-information for 14T, therefore the clock signal can be disordered as one example of the problems.

SUMMARY OF THE INVENTION

An object of the present invention is to provide a recording clock signal generating apparatus for generating a suitable recording clock signal in an information recording device for recording information in a recording medium and a method for generating the recording clock signal.

A recording clock signal generating apparatus according to the present invention located in an information recording device for recording information in a recording medium in which a wobbled information recording track and a pre-pit formed thereon, and comprises a wobble signal detecting section for detecting a wobble signal, a pre-pit signal detecting section for detecting a pre-pit signal, a phase comparing section for comparing a phase of the wobble signal to that of the pre-pit signal and outputting the phase difference, a phase-shifting section for shifting a phase of the wobble signal based on the phase difference only when the phase difference is within a predetermined range, and a clock signal generating section for generating a recording clock signal based on the phase-shifted wobble signal.

A recording clock signal generating method according to the present invention has been developed for and is applied to a recording clock signal generating apparatus according to the present invention, for generating a recording clock signal for recording information in a recording medium in which a wobbled information recording track and a pre-pit formed thereon, the method comprising the steps of: detecting a wobble signal, detecting a pre-pit signal, comparing a phase of the wobble signal to that of the pre-pit signal and outputting the phase difference, shifting a phase of the wobble signal based on the phase difference only when the phase difference is within a predetermined range, generating a recording clock signal based on the phase-shifted wobble signal.

DESCRIPTION OF THE PREFERRED EMBODIMENT(S)

An embodiment of the present invention will be described below with reference to attached drawings.

Figure 1:
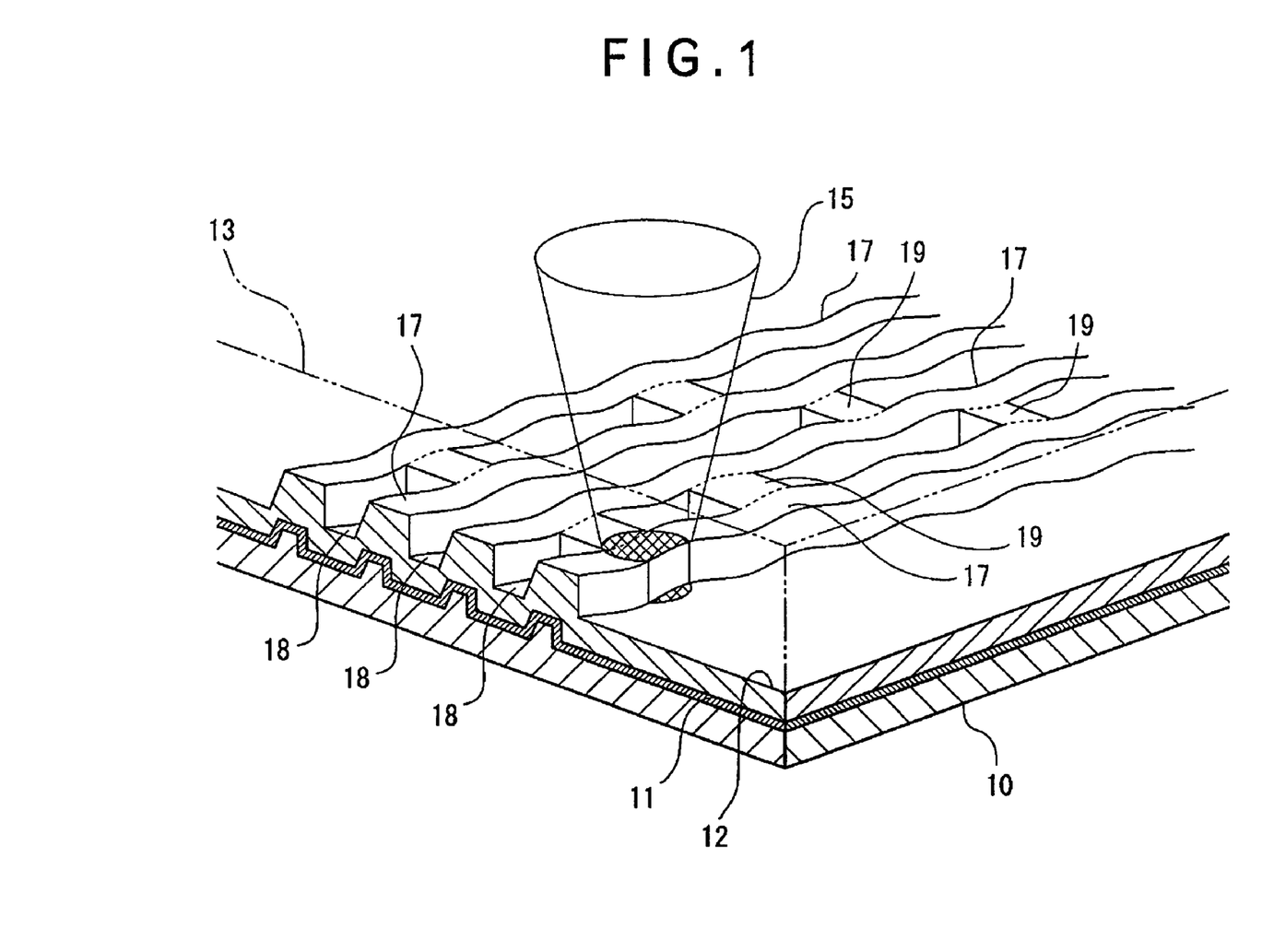
FIG. 1 is a perspective view that is partially lacked showing the structure of a DVD-R used in an information-recording device according to an embodiment of the present invention.

At first, a recording medium, in which an information-recording device according to an embodiment of the present invention records information, is described below. FIG. 1 shows a structure of a DVD-R (Digital Versatile Disc-Recordable) as an example of the recording medium.

In FIG. 1, a DVD-R 10 is a writable dye-type DVD-R in which information can be written only once. The DVD-R 10 has a gold-evaporated film 11, a dye film 12, and a protection film 13. The gold-evaporated film reflects a light beam 15 such as a laser beam when the recording information is read and regenerated. The dye film 12 records information therein as an information-recording layer provided on a surface of the gold-evaporated film 11 in the layered form. The protection film 13 is provided on a surface of the dye film 12 in the layered form to protect the dye film 12 and other related portions.

Further provided on the DVD-R 10 is a groove track 17 as a track for recording information therein, a land track 18 as a guide track, and a pre-pit 19. The groove track 17 is a track for recording information therein, and is provided in a wobbling state in other words, in a spiral form as well as a wave-like form in a peripheral direction. A waveform of this groove track 17 is designed to be a frequency corresponding to a rotating speed of the DVD-R 10. The land track 18 guides the light beam 15 as a light for regenerating or recording to the groove track 17, and is formed between the turns of the spiral groove track 17. The pre-pit 19 is formed in the land track 18 in correspondence to a pre-information.

Although detailed description is provided later, when the information recording device records information such as an image data or a musical data in the DVD-R 10, the information recording device extracts a wobbling frequency f0 of the groove track 17, controls a rotation of the DVD-R 10 in a predetermined rotating speed, and previously fetches the pre-information by detecting one of the pre-pit 19. An optimal output of the light beam 15 as a recording light is set according to the fetched pre-information, and an address information indicating a position on the DVD-R 10 where the information is to be recorded is fetched. Then, based on the fetched address information, the information is recorded in the corresponding recording position in the groove track 17.

When the information is recorded, the information-recording device irradiates the light beam 15 so that a center of the light beam 15 substantially coincides a center of a width of the spiral groove track 17. With irradiation of the light beam 15, the information-recording device forms an information pit corresponding to the information to be recorded on the groove track 17, and records the information therein.

Irradiation of the light beam 15 is set so that a portion thereof is irradiated onto the land track 18. The information recording device fetches the pre-information by detecting a pre-pit signal from the pre-pit 19 using a portion of a reflected light of the light beam 15 irradiated onto the land track 18 by means of, for instance, the Push-Pull method, and also fetches a recording clock signal synchronized to the rotation of the DVD-R 10 by extracting a wobble signal from the groove track 17. This push-pull method is a so-called radial push-pull method, and in this method a reflected light is detected with a light detector divided by division lines substantially parallel to the spiraling direction of the groove track 17 in which the DVD-R 10 rotates.

Figure 2:
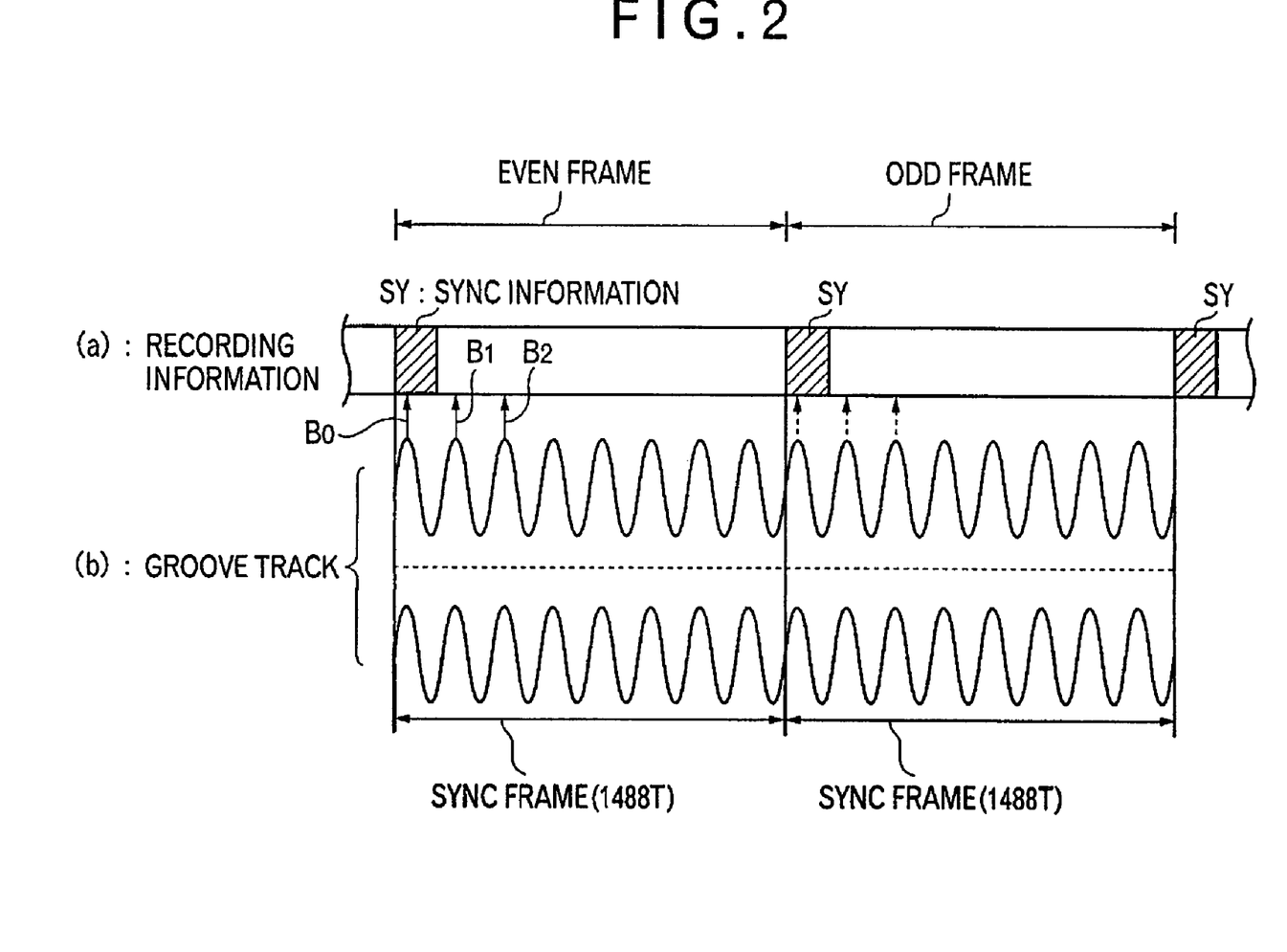
FIG. 2 is an illustration showing a recording format for recording information in the DVD-R used in the information-recording device according to the embodiment of the present invention with the section (a) showing the recording format and the section (b) showing a relation between a wobbled groove track and a pre-pit.

Next, a recording format for information is described below with reference to FIG. 2. FIG. 2(a) shows the recording format for information, and FIG. 2(b) shows a relation between the wobbling state of the groove track 17 (a plan view of the groove track 17) and a position at which the pre-pit 19 is formed as schematically indicated by an arrow.

The information recorded in the DVD-R 10 is previously divided to information units corresponding to sync-frames respectively. 26 sync-frames form one recording sector, and 16 recording sectors form an error correcting code (ECC) block. One sync-frame has the length of 1488 times (1488T) larger than the unit length (described as T hereinafter) corresponding to a space between the pits defined according to the recording format for recording information. A sync-information SY for establishing the synchronism between the sync-frames is included in the 14T length at a head of one sync-frame.

The pre-information recorded in the DVD-R 10 is recorded in each sync-frame for the recorded information. When the pre-information is recorded in the DVD-R 10 corresponding to the pre-pit 19, one pre-pit 19 indicating a sync signal in the pre-information is formed on the land track 18 adjoining an area in which the sync information SY for each sync-frame in the recorded information is recorded. Further one or two pre-pits 19 each indicating the contents of the pre-information to be recorded are formed on the land track 18 adjoining the former half portion of the sync-frame other than that for the sync information SY. It is to be noted that the pre-pit 19 may not be formed in the former half portion of the sync-frame other than that for the sync information SY according to the contents of the pre-information to be recorded.

In one recording sector, the pre-pit 19 are formed only in the sync-frames having an even number (described as an EVEN frame hereinafter), and the pre-information is recorded there. Namely, in FIG. 2, the pre-pit 19 is formed in the EVEN frame as indicated by a solid line arrow in the figure, the pre-pit 19 is not formed in a sync-frame having an odd number (described as an ODD frame hereinafter) adjoining this EVEN frame as indicated by a dotted line arrow in the figure. Whether the respective pre-pit 19 is present in the EVEN frame and the following ODD frame (indicated by B0, B1, and B2 respectively in FIG. 2) or not is decided by whether the EVEN frame is at the head of the recording sector or not, and according to the contents of information to be recorded in this EVEN frame as well as in the following ODD frame.

Specifically, when the pre-pit 19 is formed in the EVEN frame, all of the pre-pits 19 (indicated by B0, B1, and B2 in FIG. 2) are formed on the sync-frame located at the head of the recording sector. In the case where the sync frame is not present at the head of the recording sector, only the pre-pits B0 and B2 are formed when the pre-information to be recorded in the sync-frames is "1", and only the pre-pits B0 and B1 are formed when the pre-information to be recorded is "0". When the pre-pit 19 is formed in the ODD frame, only the pre-pits B0, B1 are formed in the sync-frame at the head of the recording sector. When the sync-frame is not present at the head of the recording sector, only the pre-pits B0 and B1 are formed in the same manner as the EVEN frame.

Whether the pre-pit 19 is to be formed in the EVEN frame or in an ODD frame is determined according to a position of the pre-pit 19 previously formed on the adjoining land track 18. Namely the pre-pit 19 is generally formed in the EVEN frame, but when the position of the pre-pit 19 is close to the pre-pit 19 previously formed in the adjoining land track 18 in the radial direction of the disk of the DVD-R 10, the pre-pit 19 is formed in the ODD frame. Because of this configuration, the pre-pit 19 is not present at the position in the adjoining land track 18, which reduces an effect by a crosstalk during detection of the pre-pit 19.

On the other hand, the groove track 17 is wobbled, or in other words, provided in the waveform at a constant wobbling frequency f0 over all areas. This wobbling frequency f0 indicates a frequency at which the wobble signal for eight waves is placed in one sync-frame. Namely, 186T (1488T/8) is equivalent to one wave with the wobbling frequency f0 (one wobble). By extracting this constant wobbling frequency, a signal for controlling the rotation of the DVD-R 10 is detected.

The phase relation between the pre-pit 19 and the wobble signal is kept constant. The pre-pit B0 is formed at a position with a predetermined range from a starting position of the sync-frame, namely at a position corresponding to a peak of the first wobble signal in the sync-frame as shown in FIG. 2(b). Further the pre-pits B1 and B2 are formed by 186T away from the pre-pit B0 respectively.

When information is recorded in the DVD-R 10 having the configuration as described above, the recorded information is located at a position corresponding to an address position pre-formatted on the disc. Further the pre-pit at the head of the EVEN frame or the ODD frame is accommodated within the sync information SY (with the width of 14T) for the recorded information according to the DVD-R/RW book (standard).

Figure 3:
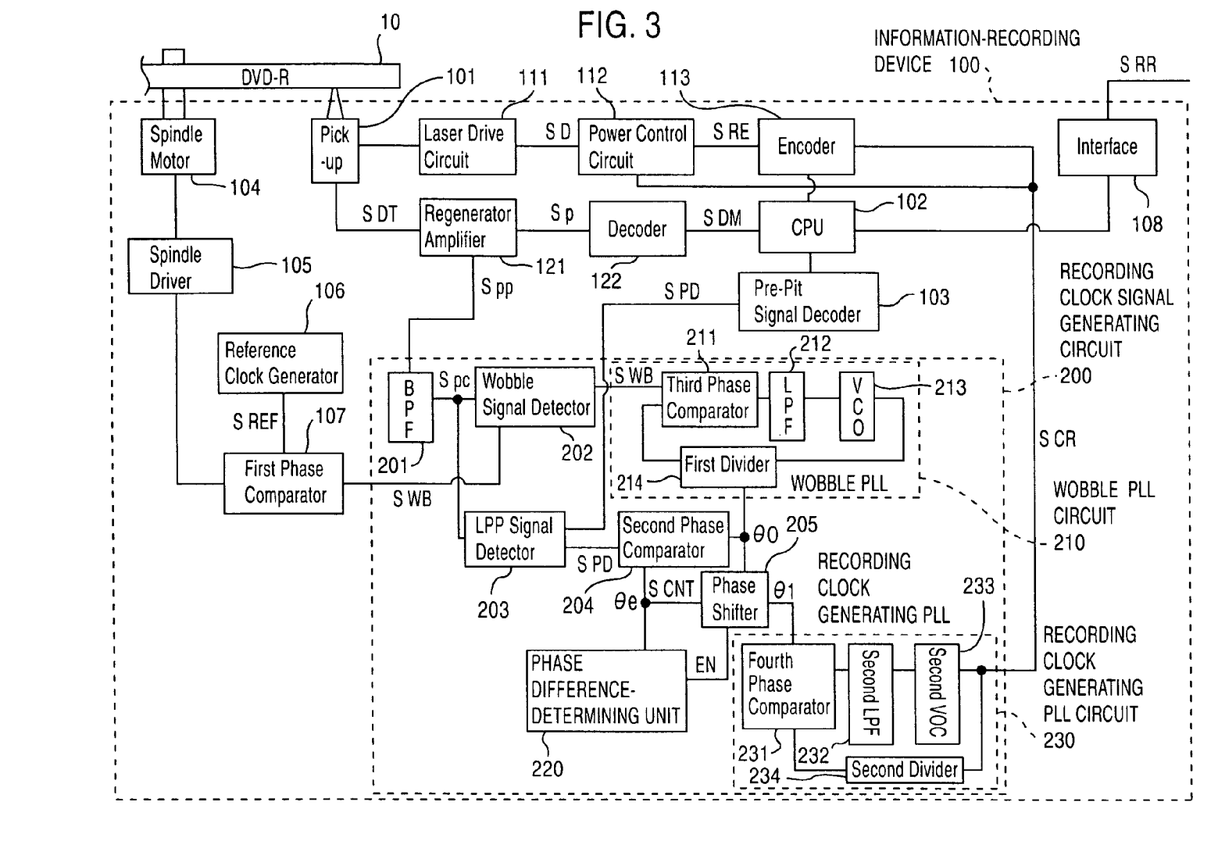
FIG. 3 is a block diagram showing a brief configuration of the information recording apparatus according to the embodiment.
Figure 4:
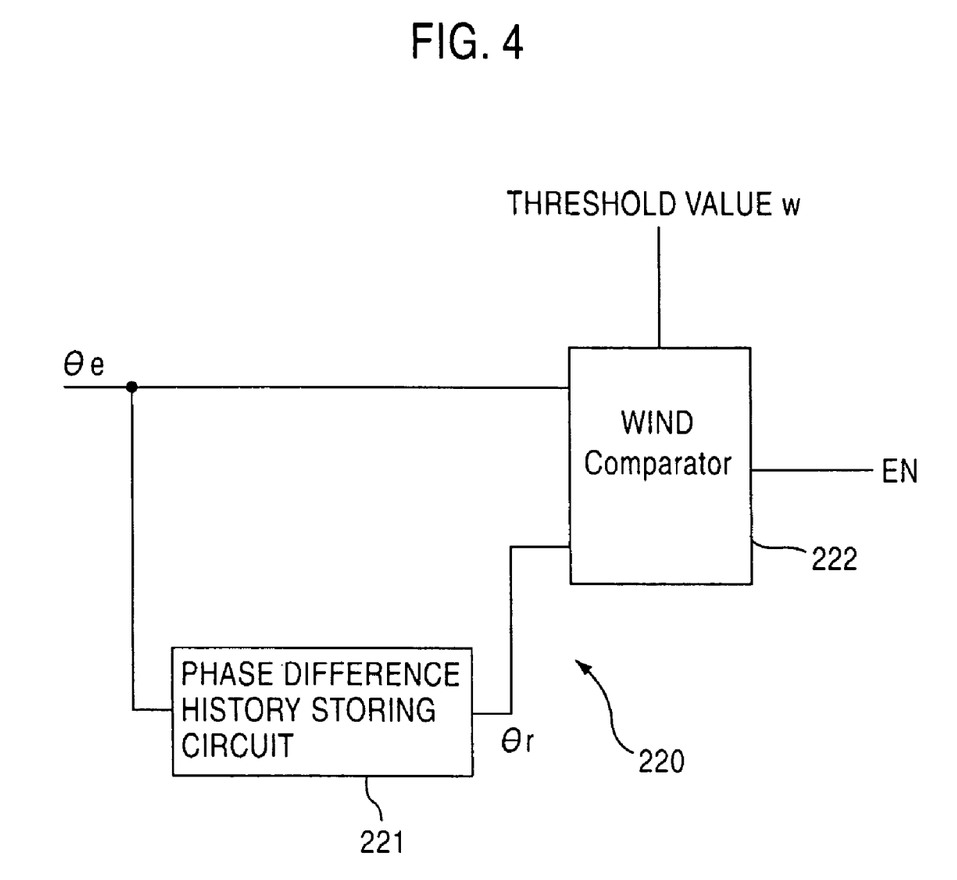
FIG. 4 is a block diagram showing the general configuration of a phase difference-determining unit constituting the information-recording device according to the embodiment.

Next, a brief configuration of the information-recording device according to the embodiment of the present invention is described with reference to FIG. 3 and FIG. 4. FIG. 3 is a block diagram showing a brief configuration of the information-recording device. FIG. 4 is a block diagram showing a configuration of a phase determining unit of a recording clock signal generating circuit.

In FIG. 3, an information recording device 100 for recording information in the DVD-R 10 comprises a pick-up (PU) 101, a processor (CPU) 102, a pre-pit signal decoder 103, a spindle motor 104, a spindle driver 105, a reference clock generator 106, a first phase comparator 107, an interface 108, a laser drive circuit 111, a power control circuit 112, and an encoder 113, a regenerator-amplifier 121, a decoder 122, and a recording clock signal generating circuit 200.

The pick-up 101 comprises a laser diode not shown, a polarized beam splitter, an object lens, an optical detector and the like. The laser drive circuit 111 is connected to this pick-up 101. The pick-up 101 irradiates the light beam 15 according to an irradiating output supplied from the laser drive circuit 111 when information is recorded and changing in response to a laser drive signal based on the recorded information to an information recording surface of the DVD-R 10 to record information thereon.

The pick-up 101 irradiates the light beam 15 with a predetermined reading output, which is a constant irradiating output, onto the information-recording surface of the DVD-R 10, and receives a reflected light therefrom with an optical detector. The received reflected light is converted to an electric signal to generate a detection signal $S_{DT}$ corresponding to, for instance, the pre-pit signal for the pre-pit 19 or to the wobble signal information for the groove track 17 and output the detection signal $S_{DT}$ to the regenerator-amplifier 121, by a computer processing based on the radial push-pull method, for instance.

The power control circuit 112 is connected to the laser drive circuit 111. The laser drive circuit 111 drives and controls the laser diode of the pick-up 101 under the control by the power control circuit 112. Namely the laser drive circuit 111 outputs the laser drive signal to make the laser diode of the pick-up 101 irradiate the light beam 15 whereas the irradiating output is corresponding to the recording signal SD corresponding to the recorded information outputted from the power control circuit 112, and control the laser diode.

The encoder 113 and the recording clock signal generating circuit 200 are connected to the power control circuit 112. The power control circuit 112 executes the processing for waveform conversion of a modulated signal SRE outputted from the encoder 113 based on a recording clock signal $S_{CR}$ outputted from the recording clock signal generating circuit 200, namely the so-called write strategy processing to generate the recording signal SD to be provided as output to the laser drive circuit 111.

The CPU 102 and the recording clock signal generating circuit 200 are connected to the encoder 113. The encoder 113 fetches the recording clock signal $S_{CR}$ outputted from the recording clock signal generating circuit 200 as a timing signal and executes an ECC processing, 8/16 modulation processing, and an scramble processing. Further the encoder 113 outputs the modulated signal $S_{RE}$ generated as a result of the 8/16 modulation processing to the power control circuit 112.

The regenerator-amplifier 121 amplifies the detection signal $S_{DT}$ generated in response to the pre-pit signal for the pre-pit 19 and the wobble signal for the groove track 17, outputted from the pick-up 101. Further the regenerator-amplifier 121 outputs a radial push-pull signal Spp containing the pre-pit signal for the pre-pit 19 and the wobble signal for the groove track 17 to the recording clock signal generating circuit 200. The regenerator-amplifier 121 outputs an amplified signal Sp corresponding to the recorded signal to the decoder 122, when the reading recorded information from the DVD-R 10.

The decoder 122 executes the 8/16 demodulation and de-interleaving processing relative to the amplified signal Sp inputted from the regenerator-amplifier 121, generates a demodulated signal $S_{DM}$ by decoding the amplified signal Sp, and outputs the demodulated signal $S_{DM}$ to the CPU 102.

The CPU 102 fetches the address information based on the pre-information outputted from the pre-pit signal decoder 103 during the operation for recording information. The CPU 102 controls the entire information-recording device 100 for recording information at a position on the DVD-R 10 corresponding to the address information. The CPU 102 fetches information recorded in the DVD-R 10, when reading and regenerating information, based on the demodulated signal $S_{DM}$ outputted from the decoder 122 and controls the entire information recording device 100 for outputting the fetched information to an external host computer not shown or the like.

The pre-pit signal decoder 103 decodes the pre-information including the address information on the DVD-R 10 based on the pre-pit signal $S_{PD}$ outputted from the recording clock signal generating circuit 200, and outputs the pre-information obtained by decoding to the CPU 102.

The spindle motor 104 is connected to a rotor not shown, on which the DVD-R 10 is mounted, and rotates the DVD-R 10.

The spindle driver 105 outputs a rotation control signal to the spindle motor 104 to drive and control the spindle motor 104 so that the DVD-R 10 rotates at a predetermined rotating speed.

The reference clock generator 106 outputs a reference clock signal $S_{REF}$. The reference clock signal $S_{REF}$ is a signal corresponding to a reference frequency component of the rotating speed of the DVD-R 10.

The first phase comparator 107 compares the phase of the reference clock signal $S_{REF}$ outputted from the reference clock generator 106 to that of the wobble signal $S_{WB}$ outputted from the recording clock signal generating circuit 200, and sends a signal indicating the phase difference as the rotation control signal via the spindle driver 105 to the spindle motor 104.

The interface 108 functions as an interface for fetching an information $S_{RR}$ sent from the host computer, not shown, which is to be recorded into the information recording device 100 under the control of the CPU 102. Then the interface 108 outputs the fetched information via the CPU 102 to the encoder 113.

The recording clock signal generating circuit 200 comprises a band-pass filter (BPF) 201, a wobble signal detector as a wobble signal detector 202, a wobble PLL circuit 210 which is a PLL (Phase Locked Loop) circuit, a pre-pit (Land Pre-Pit: LPP) signal detector 203 as a pre-pit signal detector, a second phase comparator 204 as a phase comparator, a phase shifter 205 as a phase shifting device, a phase difference determining unit 220 as a control unit, and a recording clock generating PLL circuit 230 as a clock signal generator.

The BPF 201 removes a noise element included in the radial push-pull signal Spp outputted from the regenerator-amplifier 121. The BPF 201 outputs a combined signal Spc in which the pre-pit signal is superposed at a predetermined position for the wobble signal, for instance at the maximum amplitude position to the wobble signal detector 202 and to the LPP signal detector 203 respectively.

The wobble signal detector 202 compares the combined signal Spc outputted from the BPF 201 to a predetermined reference value. The wobble value signal detector 202 generates a pulse signal for a period in which an amplitude level of the combined signal Spc is larger than the reference value as a wobble signal $S_{WB}$ and outputs the wobble signal $S_{WB}$ to the first phase comparator 107 as well as to the wobble PLL circuit 210.

The wobble PLL circuit 210 comprises a third phase comparator 211, a first low-pass filter (LPF) 212, a first voltage control oscillator (VCO) 213, and a first divider 214. In the wobble PLL circuit 210, the third phase comparator 211 adjusts the phase to that of the wobble signal $S_{WB}$, by comparing a phase of the wobble signal $S_{WB}$ outputted from the wobble signal detector 202 to that of a comparison signal generated in association with auto-exciting oscillation of the first VCO 213 and divided by a first divider 214, and outputs a phase voltage corresponding to the phase difference, while the first LPF 212 converts the phase voltage to a direct current and outputs a control voltage to the first VCO 213, and the first VCO 213 adjusts the oscillation frequency based on the control voltage. With this operation, the wobble PLL circuit 210 outputs the wobble signal $S_{WB}$ with the time fluctuation having been removed therefrom (phase θ0) to the phase shifter 205 and to the second phase comparator 204.

The LPP signal detector 203 compares the combined signal Spc outputted from the BPF 201 to a predetermined reference value. Then the LPC signal generator 203 generates a pulse signal for a period in which an amplitude level of the combined signal Spc is higher than the reference value, namely for a period in which the pre-pit 19 is present as a pre-pit signal $S_{PD}$, and outputs the pre-pit signal $S_{PD}$ to the pre-pit signal decoder 103 and to the second phase comparator 204.

The second phase comparator 204 compares a phase of the wobble signal $S_{WB}$ outputted from the wobble PLL circuit 210 to that of the pre-pit signal SPD outputted from the LPP signal detector 203. The second phase comparator 204 detects the phase difference θe, and outputs a phase adjustment signal $S_{CNT}$ corresponding to the phase difference θe to the phase shifter 205 as well as to the phase difference determining unit 220.

The phase shifter 205 increases or reduces the phase difference θ0 of the wobble signal $S_{WB}$ outputted from the wobble PLL circuit 210 according to the phase difference θe based on the phase adjustment signal $S_{CNT}$ outputted from the second phase comparator 204 to remove the fluctuation of the stroke component. With this operation, the phase shifter 205 outputs the wobble signal $S_{WB}$ with the phase θ1 synchronized to the pre-pit signal $S_{PD}$ to the recording clock generating PLL circuit 230. The phase shifter 205 is controlled according to the phase adjustment signal $S_{CNT}$ corresponding to the phase difference θe as a result of comparison of a phase of the wobble signal $S_{WB}$ to that of the pre-pit signal $S_{PD}$ with the second phase comparator 204. Further the phase shifter 205 has another control input, and is enabled to perform phase shifting only when a control input signal EN from the phase difference determining unit 220 is at a level H.

The phase difference-determining unit 220 comprises, as shown in FIG. 4, a phase difference history storing circuit 221, and a wind comparator 222. The phase difference history storing circuit 221 comprises a filter, which stores therein the phase adjustment signal $S_{CNT}$ corresponding to the phase difference θe outputted from the second phase comparator 204 as a history data according to the necessity, and outputs a history signal indicating, for instance, an average value θr of several samples in the past to the wind comparator 222. The wind comparator 222 inputs the phase adjustment signal $S_{CNT}$ from the second phase comparator 204 and the history signal from the phase difference storing circuit 221, and compares the phase difference θe to the average value θr of the phase difference θe in the past. In this step, a threshold width value W corresponding to the average value θr of the phase difference θe in the past is set by the CPU 102 in the wind comparator 222. When it is determined that the phase difference θe is within (θr±W) by the wind comparator 222, it determines that the control input signal EN outputted to the phase shifter 205 is at the level H. It is to be noted that a fixed width value for the average value θr for of the phase difference θe in the past may be set by the CPU 102 in the wind comparator 222.

The recording clock generating PLL circuit 230 comprises a fourth phase comparator 231, a second LPF 232, a second VOC 233, and a second divider 234. In the recording clock generating PLL circuit 230, the fourth phase comparator 231 compares a phase of the wobble signal $S_{WB}$ with the phase θ1 synchronized to the pre-pit signal $S_{PD}$ outputted from the phase shifter 205 to that of a comparison signal generated in association of self-exciting oscillation of the second VCO 233 and divided by the second divider 234 to output a phase voltage corresponding to the phase difference, while the second LPF 232 converts the phase voltage to a direct current and outputs a control voltage to the second VCO 233, and the second VCO 233 adjusts the oscillation frequency in response to the control voltage, and thus the phase adjustment with the wobble signal $S_{WB}$ is performed. Then the recording clock generating PLL circuit 230 generates a recording clock signal $S_{CR}$ phase-synchronized to the wobble signal $S_{WB}$ and outputs the recording clock signal $S_{CR}$ to the encoder 113 and to the power control circuit 112.

Figure 5:
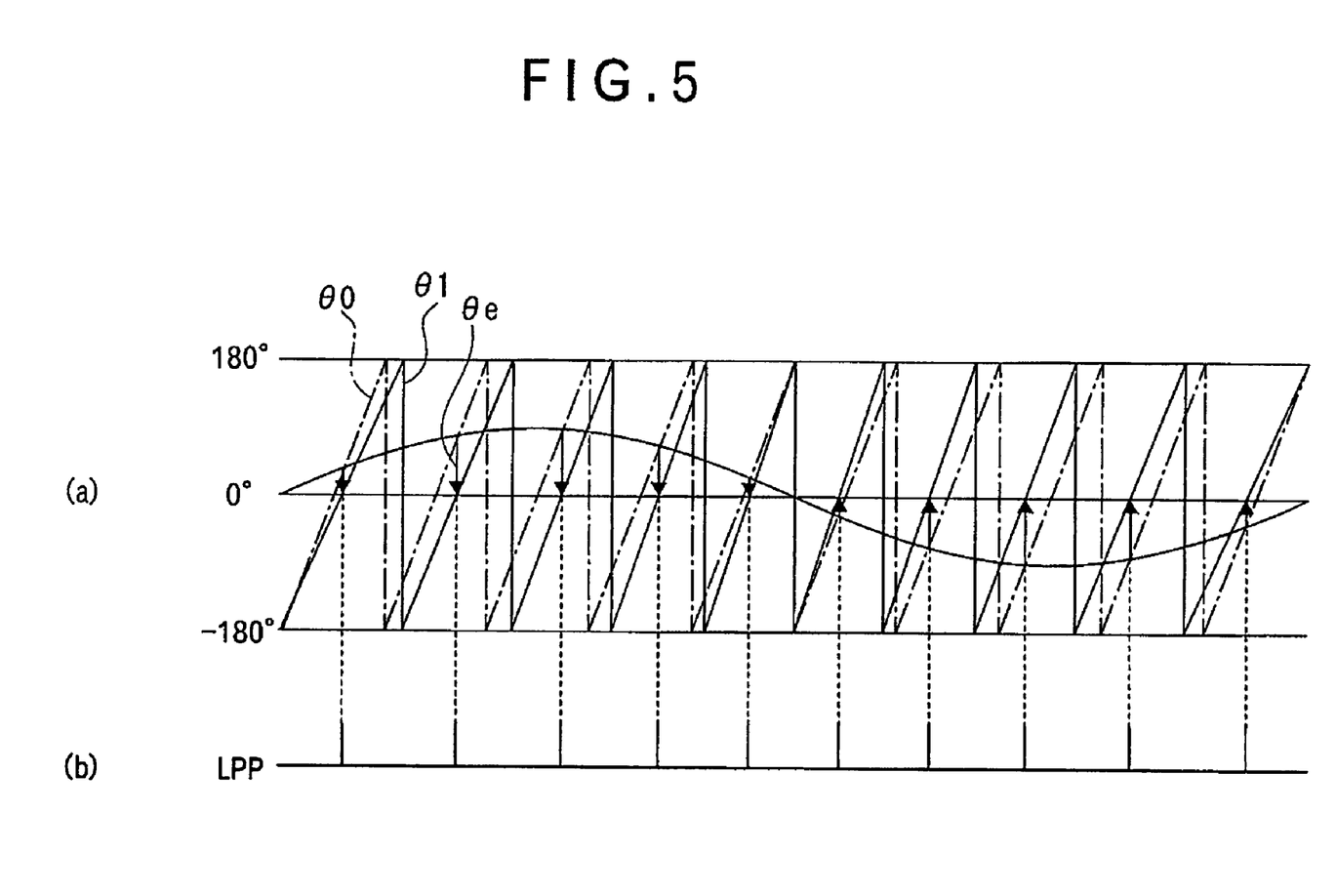
FIG. 5 is a view illustrating a wobble signal generated during the normal operation without any interference by a defect with the section (a) showing the situation in which a phase of a wobble signal is to be shifted and the section (b) showing a position of a pre-pit signal.
Figure 6:
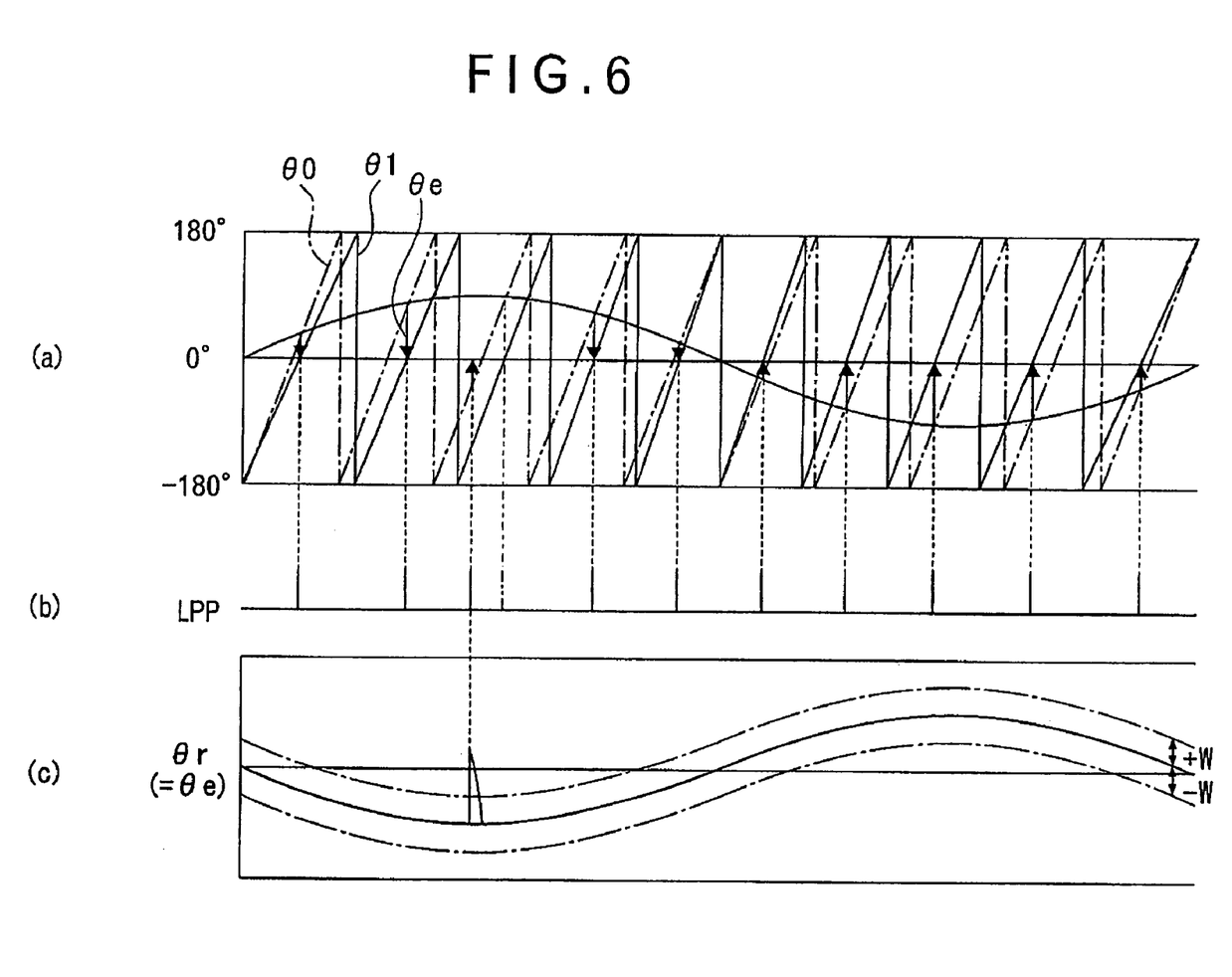
FIG. 6 is an illustration showing the phase of the wobble signal during an operation being affected by the defect with the section (a) showing the situation in which the phase of the wobble signal is to be shifted, the section (b) showing a position of the pre-pit signal, and the section (c) showing a relation between an average value θr in the past record of a phase differences θe and a set threshold width value W.

Next, an operation in the recording clock signal generating circuit 200 in the information-recording device 100 is described below with reference to FIG. 5 and FIG. 6. FIG. 5 is an illustration showing a phase of the wobble signal $S_{WB}$ during the normal operations not affected by the defect. FIG. 6 is a view illustrating a phase of the wobble signal $S_{WB}$ during defective operations being affected by the defect. For simplifying the following descriptions, it is assumed in FIG. 5 and FIG. 6 that the pre-pit signals are generated continuously.

In FIG. 5(a) and FIG. 6(a), a phase θ0 of the wobble signal $S_{WB}$ outputted from the wobble PLL circuit 210 is indicated by a triangular wave shown by a solid line, a phase θ1 of the wobble signal $S_{WB}$ outputted from the phase shifter 205 with a triangular wave shown with a dotted line, and a phase difference θe indicated by the phase difference adjustment signal $S_{CNT}$ outputted from the second phase comparator 204 with an arrow shown by a solid line respectively. FIG. 5(b) and FIG. 6(b) show a position of the pre-pit signal $S_{PD}$ respectively. Further FIG. 6(c) shows the relation between the average value θr of the phase differences θe in the past and the threshold width value W set as described above.

At first, the information recording device 100 with the DVD-R 10 mounted thereon for recording information irradiates the light beam 15 at a predetermined reading output level from the pick-up 101 onto a information recording surface of the DVD-R 10 under the control by the CPU 102, receives the reflected light with the light detector, and has the radial push-pull signal Spp including the pre-pit signal for the pre-pit 19 on the DVD-R 10 and the wobble signal for the groove track 17 inputted via the regenerator-amplifier 121 into the recording clock signal generating circuit 200. Then the information recording device 100 generates the recording clock signal $S_{CR}$ phase-synchronized to the wobble signal $S_{WB}$ based on the radial push-pull signal Spp in the recording clock signal generating circuit 200, irradiates the light beam 15, using this recording clock signal $S_{CR}$ as a timing signal, in response to the laser drive signal based on the information to be recorded, from the pick-up 101 onto the information recording surface of the DVD-R 10 to record the information at the predetermined position in the groove track 17 continuously.

In this step, the recording clock signal generating circuit 200 removes the noise element of the radial push-pull signal Spp outputted from the regenerator-amplifier 121 with the BPF 201, and makes the combined signal Spc superposed with the pre-pit signal at the predetermined position in the wobble signal to the wobble signal detector 202 and to the LPP signal detector 203. Then the recording clock signal generating circuit 200 generates the wobble signal $S_{WB}$ based on the combined signal Spc in the wobble signal detector 202, and also generates the wobble signal $S_{WB}$ with the phase θ0 with the time fluctuation having been removed therefrom in the wobble PLL circuit 210. Further the recording clock signal generating circuit 200 generates the pre-pit signal based on the combined signal Spc with the LPP signal detector 203.

The recording clock signal generating circuit 200 compares the phase of the wobble signal $S_{WB}$ outputted from the wobble PLL circuit 210 to that of the pre-pit signal $S_{PD}$ outputted from the LPP signal detector 203 with the second phase comparator 204, and generates the phase adjustment signal $S_{CNT}$ corresponding to the phase difference θe. The recording clock signal generating circuit 200 stores therein the history of the phase difference θe in the phase difference history storing circuit 221 in the phase difference determining unit 220, generates the average value θr for several samples in the past, compares the phase difference θe to the average value θr with the wind comparator 222, and allows to output the control input signal EN at the level H only when the phase difference θe is within the range of (θr±W).

When the control input signal EN to the phase shifter 205 is at the level H, the recording clock signal generating circuit 200 shifts the phase θ0 of the wobble signal S outputted from the wobble PLL circuit 210 with the phase shifter 205 according to only by the phase difference θe based on the phase adjustment signal $S_{CNT}$ outputted from the second phase comparator 204 and generates the wobble signal $S_{WB}$ with the phase θ1 synchronized to the pre-pit signal $S_{PD}$. Namely, the phase θ0 of the wobble signal $S_{WB}$ is shifted according to only by the phase difference θe as a phase correction value to be phase θ1. Then the recording clock signal generating circuit 200 outputs the wobble signal $S_{WB}$ with the phase θ1 generated by the phase shifter 205 to the recording clock generating PLL circuit 230, and then the recording clock generating PLL circuit 230 generates a recording clock signal $S_{CR}$ synchronized to the wobble signal $S_{WB}$ with the phase θ1 in the recording clock generating PLL circuit 230.

During the normal operation, namely in the state not affected by the defect, the pre-pit signal $S_{PD}$ is generated by detecting the pre-pit 19 as shown in FIG. 5(b), so that the phase difference θe is as shown by the arrow in FIG. 5(a). The phase θ0 of the wobble signal $S_{WB}$ is shifted according to only by this phase difference θe by the second phase comparator 204. As a result, the phase θ1 of the wobble signal $S_{WB}$ synchronized to that of the pre-pit signal $S_{PD}$, namely, the pre-pit signal can be obtained.

On the other hand, during the defective operation, a position of the pre-pit signal $S_{PD}$ is shifted due to the defect as shown in FIG. 6(b), and the phase difference θe is as shown by an arrow in FIG. 6(a). Namely the phase difference θe suddenly changes as shown in FIG. 6(c). The second phase comparator 204 is operated with this phase difference θe unchanged, the recording clock signal $S_{CR}$ generated by the recording clock generating PLL circuit 230 is disturbed, and the signal displaced from the reference is recorded in the DVD-R 10.

When the error as described above occurs, the phase difference determining unit 220 determines that the threshold width value W according to the average value θr for phase differences θe in the past has been surpassed, and detects the defect. Further, when the phase difference determining unit 220 detects the defect, it outputs the control input signal EN at the level L to the phase shifter 205 to give an instruction not to conduct the phase-shifting operation at the phase difference θe associated with the erroneous pre-pit signal $S_{PD}$. Because of the feature as described above, the recording clock signal $S_{CR}$ generated in the recording clock generating PLL circuit 230 is never disturbed, and recording in the DVD-R 10 is always performed correctly.

As described above in detail, the information recording device 100 according to the present embodiment comprises the wobble signal detector 202, the pre-pit signal detector 203, the second phase comparator 204, the phase shifter 205, and the recording clock generating PLL circuit 230, and because of this configuration, when the pre-pit signal $S_{PD}$ is erroneously detected due to the defect, as the phase of the wobble signal $S_{WB}$ is always compared to that of the pre-pit signal $S_{PD}$, therefore detection of and protection against the defect are always carried out without fail.

Because of the configuration as described above, the information recording device 100 give an instruction not to conduct the phase-shifting operation by using the phase difference θe of the erroneous pre-pit signal $S_{PD}$, therefore the effect on the erroneous detection can be prevented, and can generate the stable recording clock signal $S_{CR}$.

Incidentally, the scope of the present invention is not restricted to the above embodiment, but includes following modifications as long as an object of the present invention can be achieved.

The recording medium is not limited to the DVD-R, but any recording medium such as a DVD-RW may be used so far as the groove track 17 as the recording track is provided in the wobbling state and the pre-pit 19 is formed between the turns of the groove track 17.

Though the description above assumes a case where the wobble signal $S_{WB}$ detected by the wobble signal detector 202 is processed by the wobble PLL circuit 210 and then is compared to the pre-pit signal $S_{PD}$, such arrangement is not limiting, but the wobble signal $S_{WB}$ detected by the wobble signal detector 202 may be compared to the pre-pit signal $S_{PD}$.

Further the configuration for generating the wobble signal $S_{WB}$ synchronized to the pre-pit signal $S_{PD}$ is not limited to that in which phase shifting is carried out by the phase shifter 205 according to the phase difference θe indicated by the phase signal adjustment signal $S_{CNT}$, and the wobble signal $S_{WB}$ synchronized to the pre-pit signal $S_{PD}$ may be generated in any way.

Further the configuration for monitoring an erroneous phase difference indicated by the phase adjustment signal $S_{CNT}$ is not limited to that in which the phase adjustment signals $S_{CNT}$ in the past are fetched to calculate the average value to monitor any error, but method may be employed including those, for instance which an erroneous phase difference is monitored by setting a reference value separately and comparing the given phase difference to the reference value, or in which the difference from the phase adjustment signal $S_{CNT}$ just ahead is monitored for checking any rapid change in the difference from the phase adjustment signal $S_{CNT}$ just ahead.

What is claimed is:

1. A recording clock signal generating apparatus located in an information recording device for recording information in a recording medium in which a wobbled information recording track and pre-pit formed thereon, said apparatus comprising:
   a wobble signal detecting section for detecting a wobble signal;
   a pre-pit signal detecting section for detecting a pre-pit signal;
   a phase comparing section for comparing a phase of said wobble signal to that of said pre-pit signal and outputting the phase difference;
   a determining section for determining whether the pre-pit signal is generated by erroneous detection of the pre-pit or not;
   a phase-shifting section for shifting a phase of said wobbled signal based on said phase difference only when the determining section determines that the pre-pit signal is not generated by the erroneous detection; and
   a clock signal generating section for generating a recording clock signal based on said phase-shifted wobble signal,
   wherein the determining section compares the phase difference with a predetermined threshold, does not determine that the pre-pit signal is generated by the erroneous detection when the phase difference is within the threshold and determines that the pre-pit signal is generated by the erroneous detection when the phase difference is out of the range of the threshold.

2. The recording clock signal generating apparatus according to claim 1 further comprising:
   a control section for controlling said phase-sifting section when said phase difference is within a threshold width value set for the phase differences in the past.

3. The recording clock signal generating apparatus according to claim 2, wherein said control section comprises a history data storing section for storing therein history data for said phase differences and a phase comparing section for comparing a given phase difference to the history data for the phase differences stored in said history data storing section.

4. The recording clock signal generating apparatus according to claim 3, wherein said history data storing section outputs an average value for said phase differences in the past stored therein.

5. The recording clock signal generating section according to claim 3, wherein said phase difference comparing section sets a control signal outputted to said phase-shifting section at a high level only when the threshold width value relative to the history data of said phase differences in the past is set and said phase difference is within the threshold width value.

6. The recording clock signal generating apparatus according to claim 1, further comprising a control unit for controlling said phase-shifting section only when said phase difference is within a fixed width value set relative to the phase difference.

7. A recording clock signal generating method for recording information in a recording medium in which a wobbled information recording track and a pre-pit formed thereon, said method comprising the steps of:
   detecting a wobble signal;
   detecting a pre-pit signal;
   comparing a phase of said wobble signal to that of said pre-pit signal and outputting the phase difference;
   determining whether the pre-pit signal is generated by erroneous detection of the pre-pit or not;
   shifting a phase of said wobble signal based on said phase difference only when it is determined that the pre-pit signal is not generated by the erroneous detection; and
   a clock signal generating step of generating a recording clock signal based on said phase-shifted wobble signal,
   wherein the determining step compares the base difference with a predetermined threshold, does not determine that the pre-pit signal is generated by the erroneous detection when the phase difference is within the threshold and determines that the pre-pit signal is generated by the erroneous detection when the phase difference is out of the range of the threshold.

* * * * *

UNITED STATES PATENT AND TRADEMARK OFFICE
CERTIFICATE OF CORRECTION

PATENT NO. : 7,366,067 B2 Page 1 of 1
APPLICATION NO. : 10/615386
DATED : April 29, 2008
INVENTOR(S) : Yuji Tawaragi It is certified that error appears in the above-identified patent and that said Letters Patent is hereby corrected as shown below:

<u>In Column 12, Claim 7</u>

On line 16, "base"

should read:

On line 16, --phase--

Signed and Sealed this

Fifth Day of August, 2008

JON W. DUDAS
*Director of the United States Patent and Trademark Office*